United States Patent [19]
Yamamoto

[11] Patent Number: 5,754,345
[45] Date of Patent: May 19, 1998

[54] WIDE ANGLE IMAGING LENS

[75] Inventor: Chikara Yamamoto, Omiya, Japan

[73] Assignee: Fuji Photo Optical Co., Ltd., Omiya, Japan

[21] Appl. No.: 668,183

[22] Filed: Jun. 21, 1996

[30] Foreign Application Priority Data

Sep. 19, 1995 [JP] Japan ............................ 7-266226

[51] Int. Cl.$^6$ .............................. G02B 21/02; G02B 9/12
[52] U.S. Cl. ....................... 359/661; 359/754; 359/784
[58] Field of Search ......................... 359/784, 754, 359/722, 659–661

[56] References Cited

U.S. PATENT DOCUMENTS

| | | | |
|---|---|---|---|
| 3,907,401 | 9/1975 | Liu | 359/754 |
| 4,702,569 | 10/1987 | Mercado et al. | 359/722 |
| 4,761,064 | 8/1988 | Mercado et al. | 359/784 |
| 4,792,219 | 12/1988 | Mihara | 359/754 |
| 5,204,782 | 4/1993 | Mercado et al. | 359/754 |
| 5,272,564 | 12/1993 | Suzuki et al. | 359/676 |
| 5,555,479 | 9/1996 | Nakagiri | 359/355 |

FOREIGN PATENT DOCUMENTS 48-34531  5/1973  Japan.

*Primary Examiner*—David C. Nelms
*Assistant Examiner*—Evelyn A. Lester
*Attorney, Agent, or Firm*—Ronald R. Snider

[57] ABSTRACT

A first lens group composed of at least three sheets of lenses, a second lens group composed of positive, negative, and positive lenses, and a third lens group composed of at least two sheets of lenses are successively disposed from the object side, while these lenses are made of at least two kinds of glass materials having a difference in dispersion therebetween smaller than 0.0055 and satisfy predetermined conditional expressions, thereby yielding a wide angle imaging lens with a high brightness and a wide field angle which can favorably correct various kinds of aberration, in particular, such as chromatic aberration and image surface. From the object side, the first lens group comprising, successively from the object side, a negative first lens $L_1$, a positive second lens $L_2$, and a negative third lens $L_3$; the second lens group comprising, successively from the object side, a positive fourth lens $L_4$, a negative fifth lens $L_5$, and a positive sixth lens $L_6$; and the third lens group comprising, successively from the object side, a positive seventh lens $L_7$ and a negative eighth lens $L_8$ are successively disposed, while the difference in dispersion between the materials forming the lenses is made smaller than 0.0055, and the lenses are configured so as to satisfy the following conditional expressions:

$-0.8 < F/F_1 < 0.2$, $0.2 < F_{23}/F_2 < 1.0$, $0.3 < F/f_a < 1.0$, $0.6 < |F/f_b| < 1.5$, and $0.2 < F/f_c < 1.0$

3 Claims, 19 Drawing Sheets

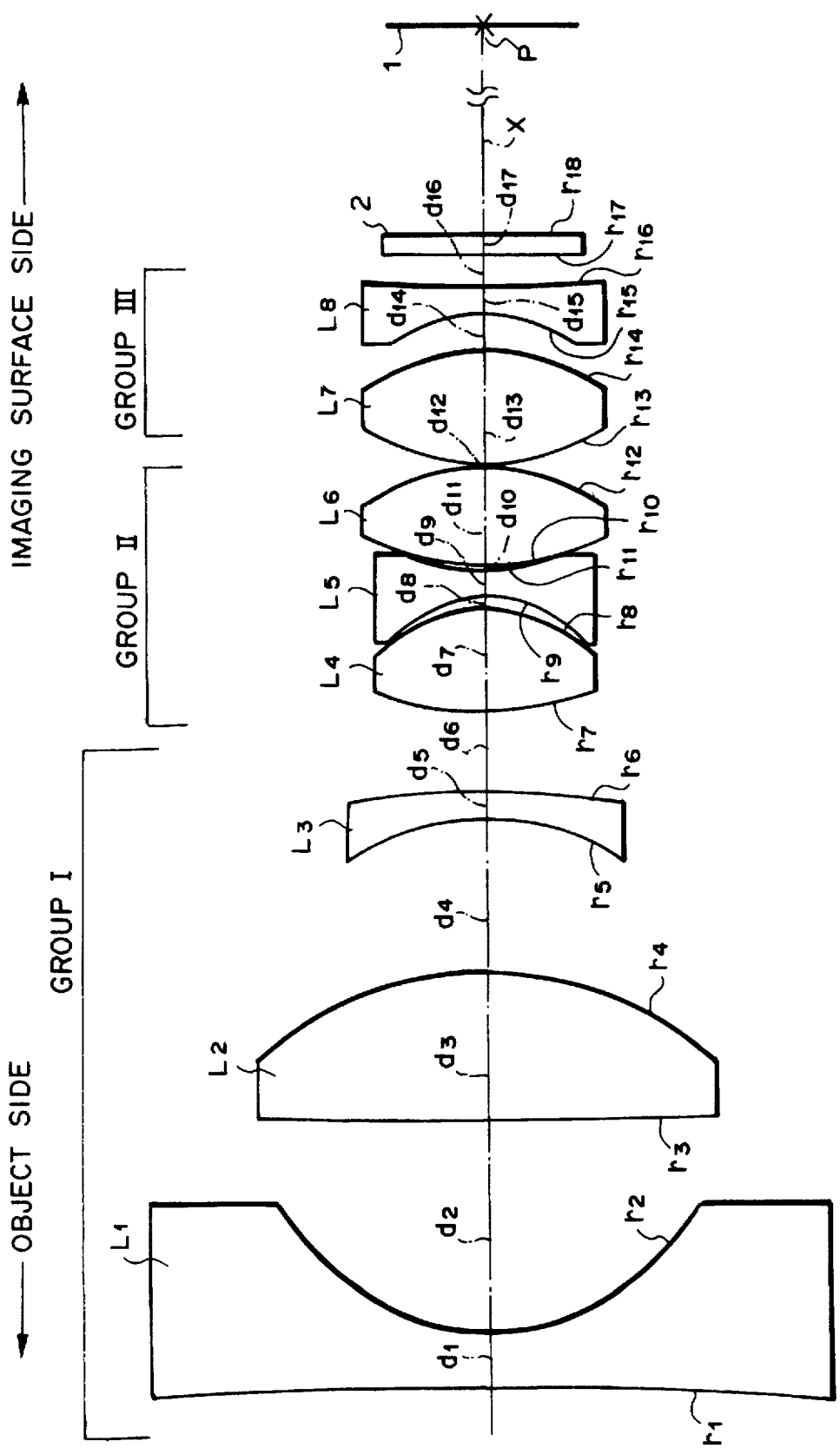
F I G. 2

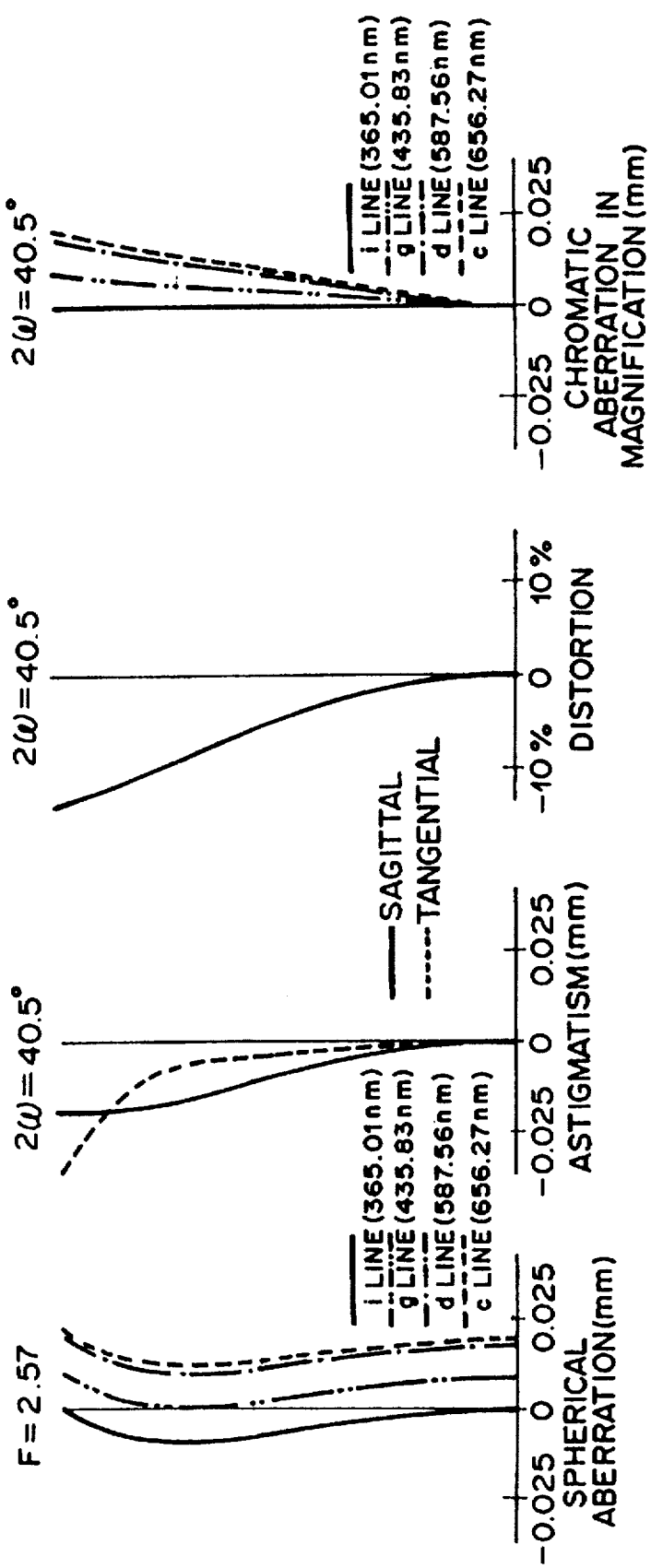

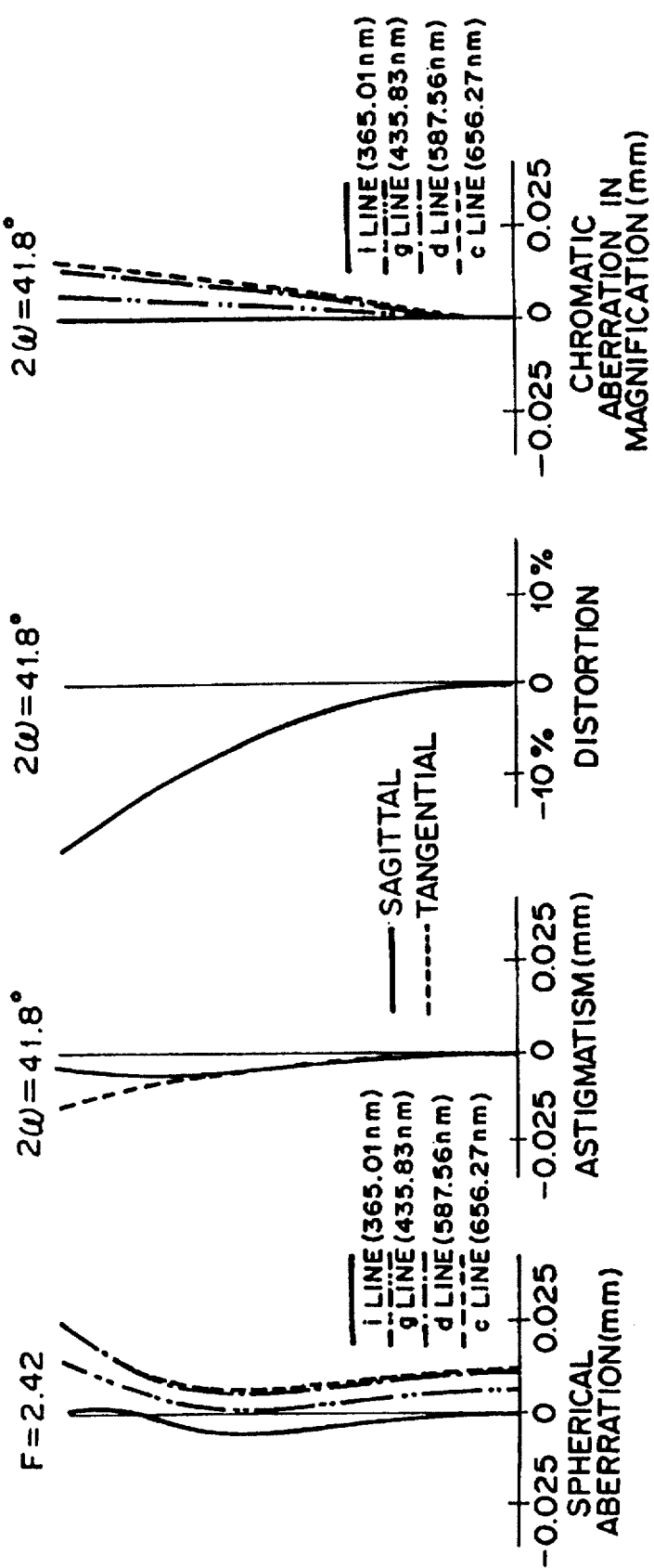

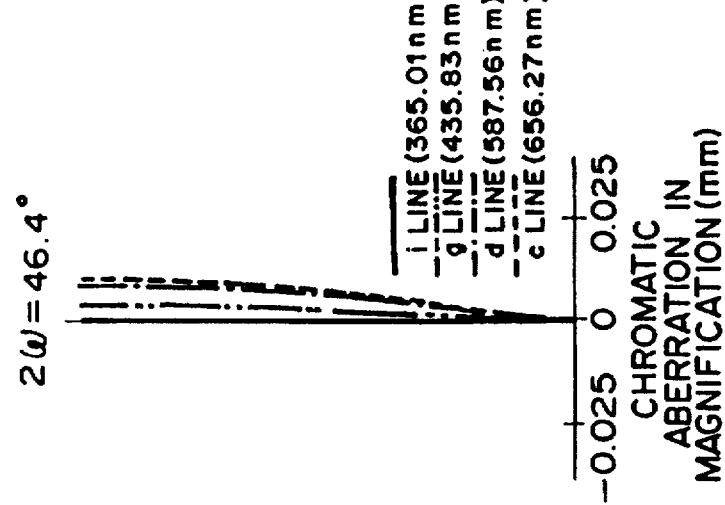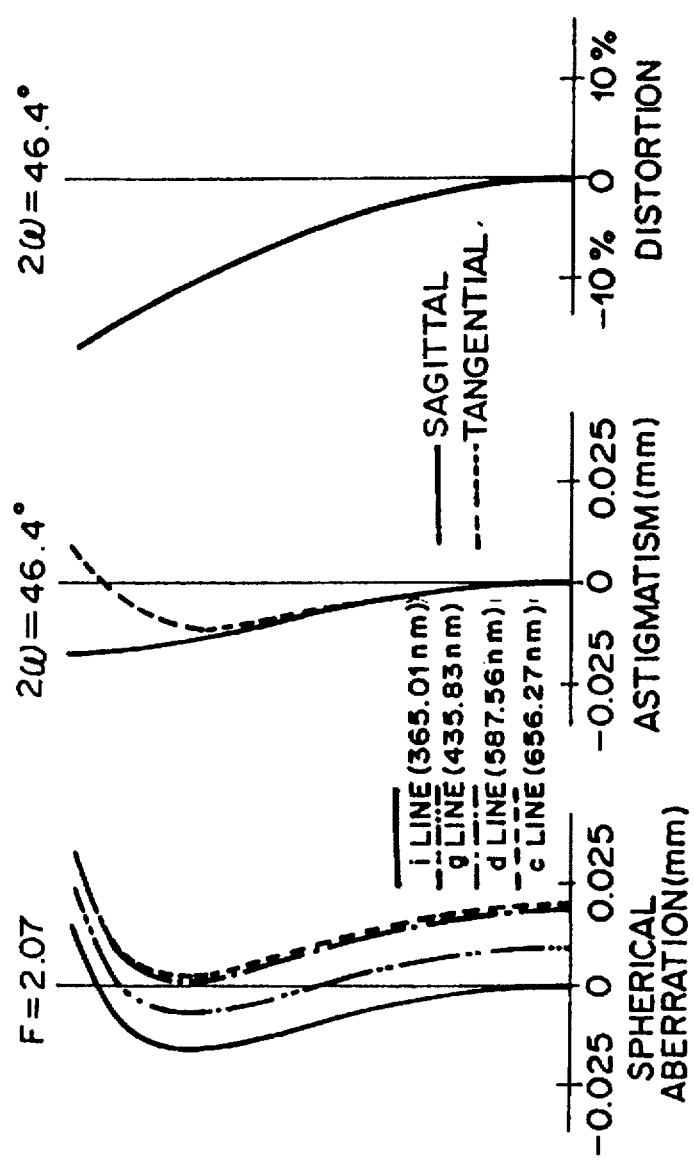
FIG.14A  FIG.14B  FIG.14C  FIG.14D

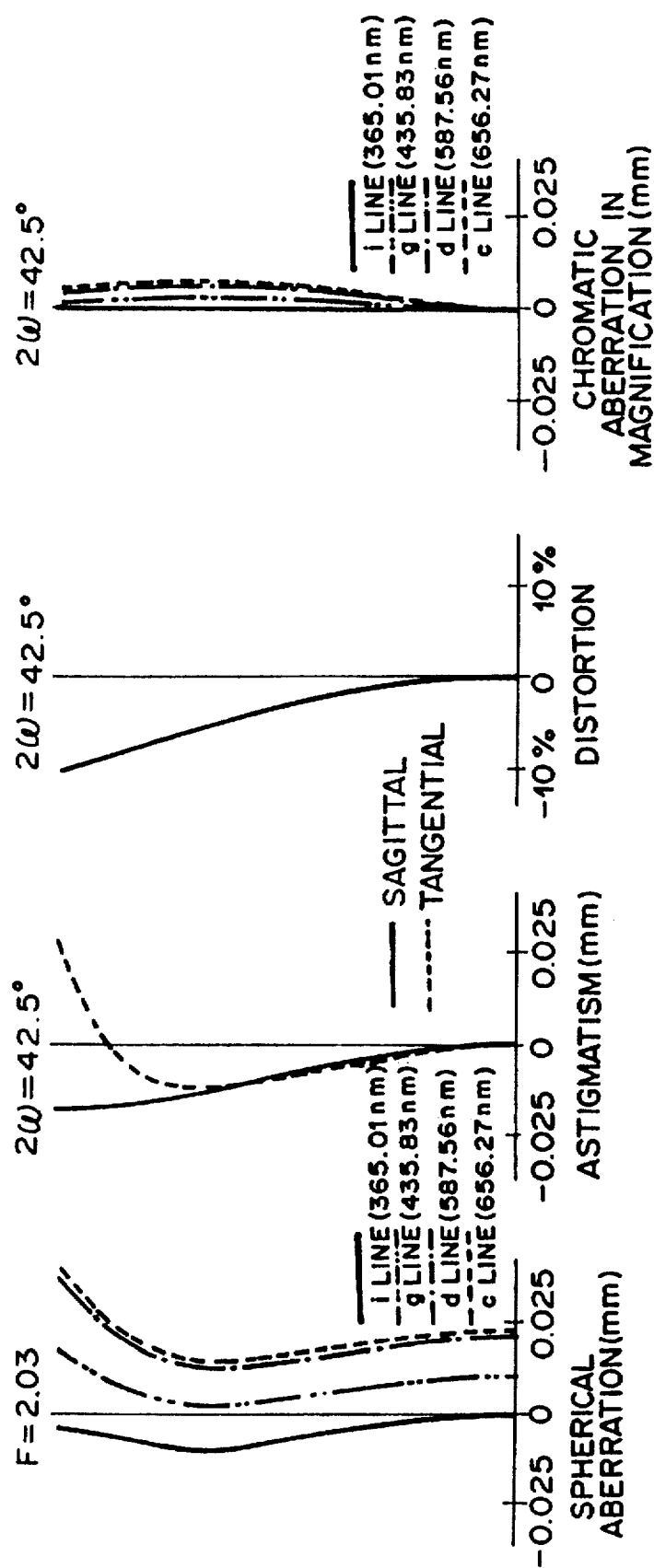

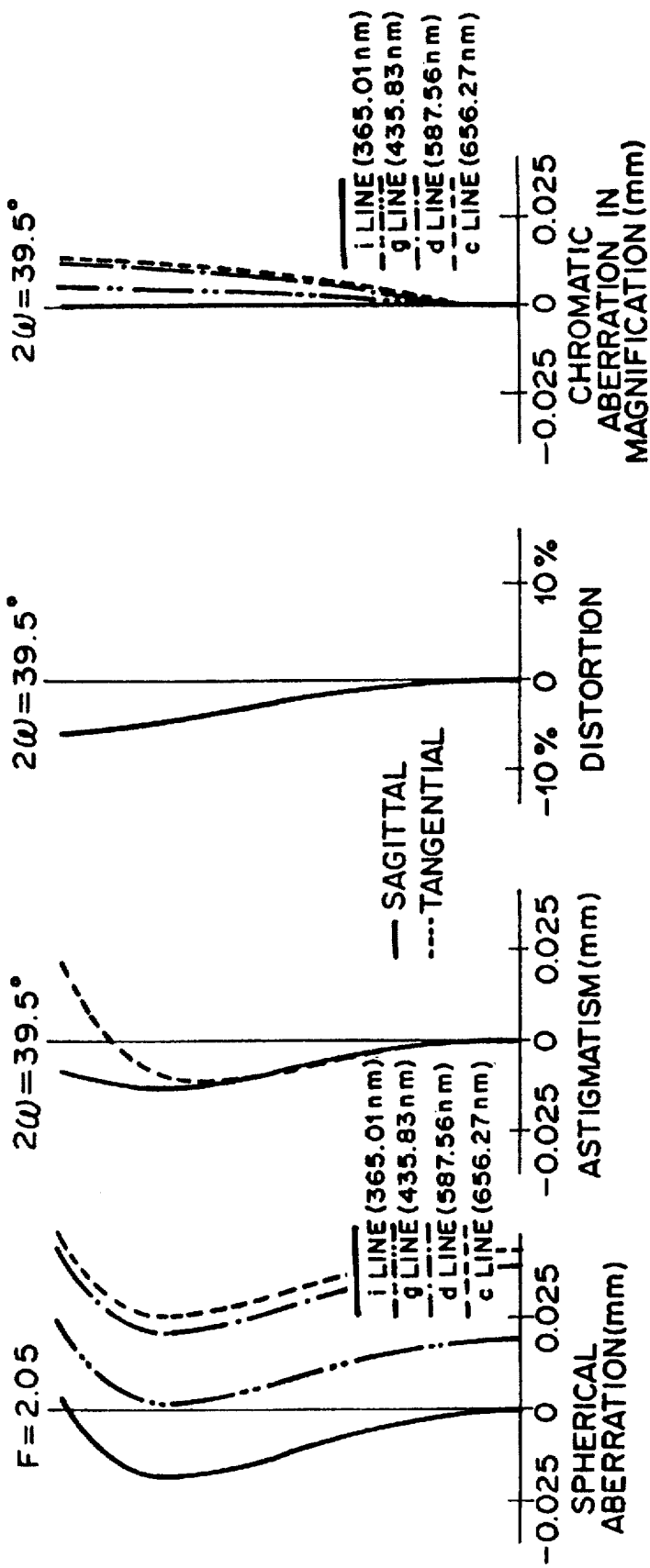

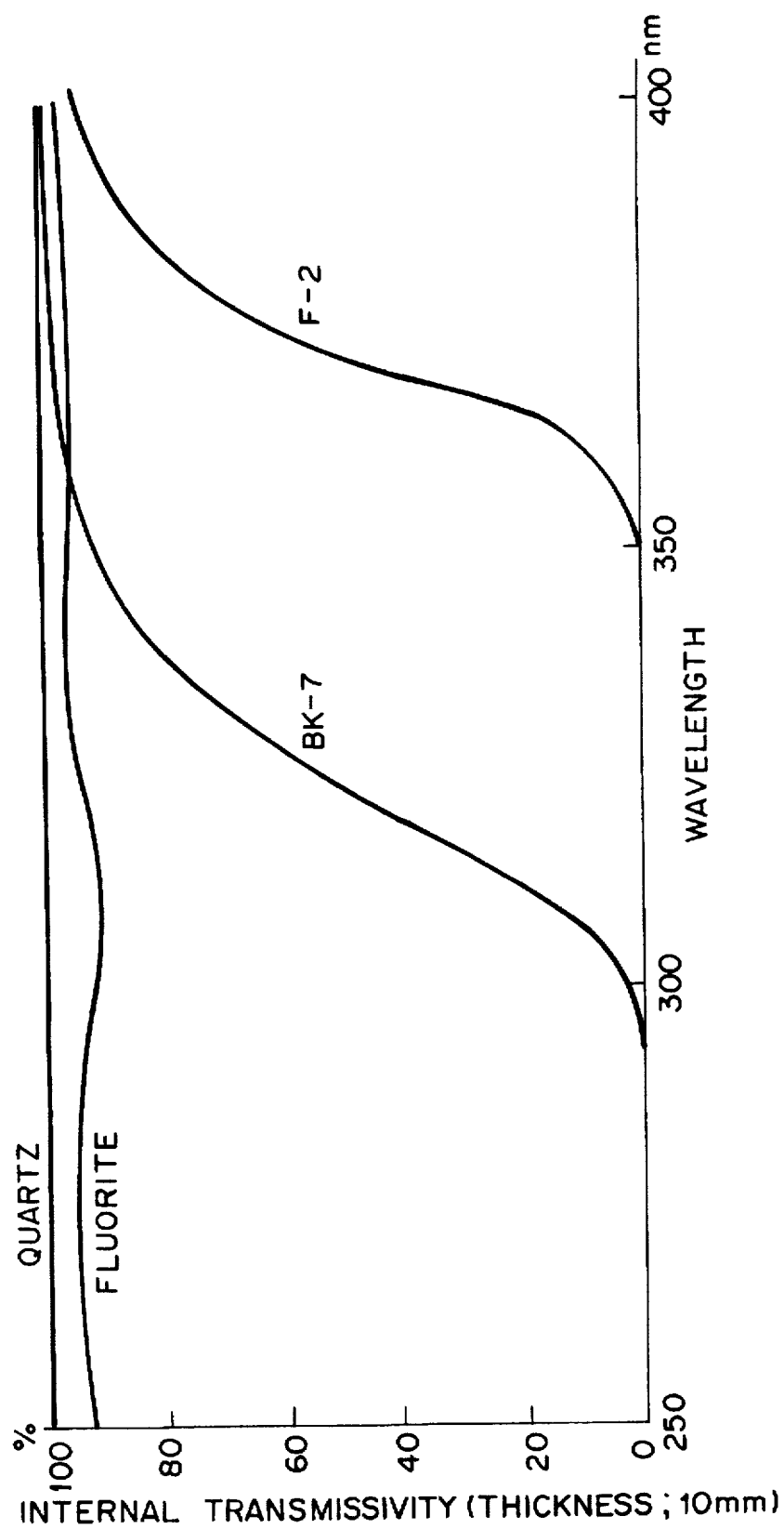

WIDE ANGLE IMAGING LENS

RELATED APPLICATIONS

This application claims the priority of Japanese Patent Application No. 7-266226 filed on Sep. 19, 1995, which is incorporated herein by reference.

BACKGROUND OF THE INVENTION

1. Field of the Invention

The present invention relates to a wide angle imaging lens used for various cameras such as video cameras using CCD, image pickup tubes, and the like and photographic cameras in which an object image is formed on a silver halide film and, in particular, to a wide angle imaging lens which is suitably used in ultraviolet region.

2. Description of the Prior Art

Conventionally, in lenses used in ultraviolet region, glass materials therefor have been quite limited in order to attain favorable light transmittance. As a result, glass materials made of crystals of fluorite or quartz have mostly been used therefor.

In the lenses made of such limited glass materials, chromatic aberration is hard to decrease since it is difficult to attain a large difference in dispersion between the lens forming materials. Also, due to the low refractive index of the above-mentioned crystals, their Petzval sum tends to become large. Accordingly, they have mainly been used as lenses having a narrow field angle such as objective lenses for microscope and not always suitable for camera lenses. Further, depending on their crystal configuration, it has been difficult to form a surface having a small radius of curvature with a high accuracy. Also, there has been a problem that only convex surfaces can be polished, thereby making it further difficult to correct their aberration.

Japanese Unexamined Patent Publication No. 48-34531 discloses an imaging lens for improving these problems.

While the imaging lens disclosed in the above-mentioned publication has a field angle of 29 degrees which is broader than that of the conventional lenses, it is still not always sufficient. Also, it may not be sufficient in terms of brightness and image surface correction. Further, it may be insufficient in terms of correction of chromatic aberration, in particular, in ultraviolet region.

SUMMARY OF THE INVENTION

In view of such a circumstance, the object of the present invention is to provide a wide angle imaging lens which has a broad field angle and a high brightness and can favorably correct chromatic aberration, while sufficiently effecting image surface correction, when a plurality of glass materials having a low refractive index and a small difference in dispersion therebetween at a wavelength band in use are used.

In order to achieve the above-mentioned object, the wide angle imaging lens of the present invention comprises, successively from the object side, a first lens group made of at least three lenses; a second lens group which has a positive refractive power and is made of three sheets of lenses respectively having positive, negative, and positive refractive powers, while each of these three lenses is composed of a single lens or at least two sheets of lenses bonded together; and a third lens group made of at least two sheets of lenses;

wherein all the above-mentioned lenses are constituted by at least two kinds of materials whose difference in dispersion therebetween is smaller than 0.0055 and wherein the following conditional expressions are satisfied:

$$-0.8 < F/F_1 < 0.2 \quad (1)$$

$$0.2 < F_{23}/F_2 < 1.0 \quad (2)$$

$$0.3 < F/f_a < 1.0 \quad (3)$$

$$0.6 < |F/f_b| < 1.5 \quad (4)$$

$$0.2 < F/f_c < 1.0 \quad (5)$$

wherein

F: focal length of the lens system as a whole;
$F_1$: focal length of the first lens group;
$F_2$: focal length of the second lens group;
$F_{23}$: composite focal length of the second lens group and third lens group;
$f_a$: focal length of the positive lens on the object side in the second lens group;
$f_b$: focal length of the negative lens in the second lens group; and
$f_c$: focal length of the positive lens on the image side in the second lens group.

In the above-mentioned wide angle imaging lens, desirably, the light transmittance of the material forming each lens with respect to light having a wavelength of 300 to 800 nm is set to 50% or higher when the material has a thickness of 10 mm.

In particular, desirably, fluorite and quartz are used as materials for forming the above-mentioned lenses, while, among the lenses constituting the above-mentioned second lens group, the two positive lenses are made of fluorite, whereas the negative lens is made of quartz.

Here, the dispersion of the material forming the above-mentioned lens is defined as follows:

$$\text{dispersion in lens material} = N_F - N_C$$

wherein $N_F$ is refractive index of the lens material with respect to F-line (wavelength at 486.13 nm) and $N_C$ is refractive index of the lens material with respect to C-line (wavelength at 656.27 nm).

BRIEF DESCRIPTION OF THE DRAWINGS

FIG. 2 is a schematic view showing a basic lens configuration in accordance with Embodiment 2 of the present invention;

FIG. 10 is an aberration chart of the lens in accordance with Embodiment 1;

FIG. 12 is an aberration chart of the lens in accordance with Embodiment 3;

FIG. 14 is an aberration chart of the lens in accordance with Embodiment 5;

FIG. 15 is an aberration chart of the lens in accordance with Embodiment 6;

FIG. 18 is an aberration chart of the lens in accordance with Embodiment 9; and

FIG. 19 is a graph showing light transmittance characteristics of fluorite and quartz.

DETAILED DESCRIPTION OF THE PREFERRED EMBODIMENTS

In the following, embodiments of the present invention will be explained with reference to drawings. While nine embodiments will be specifically explained in the following, in the explanation of the drawings corresponding to the respective embodiments, elements identical to each other will be referred to with marks identical to each other without repeating their overlapping explanations.

Embodiment 1

Figure 1:
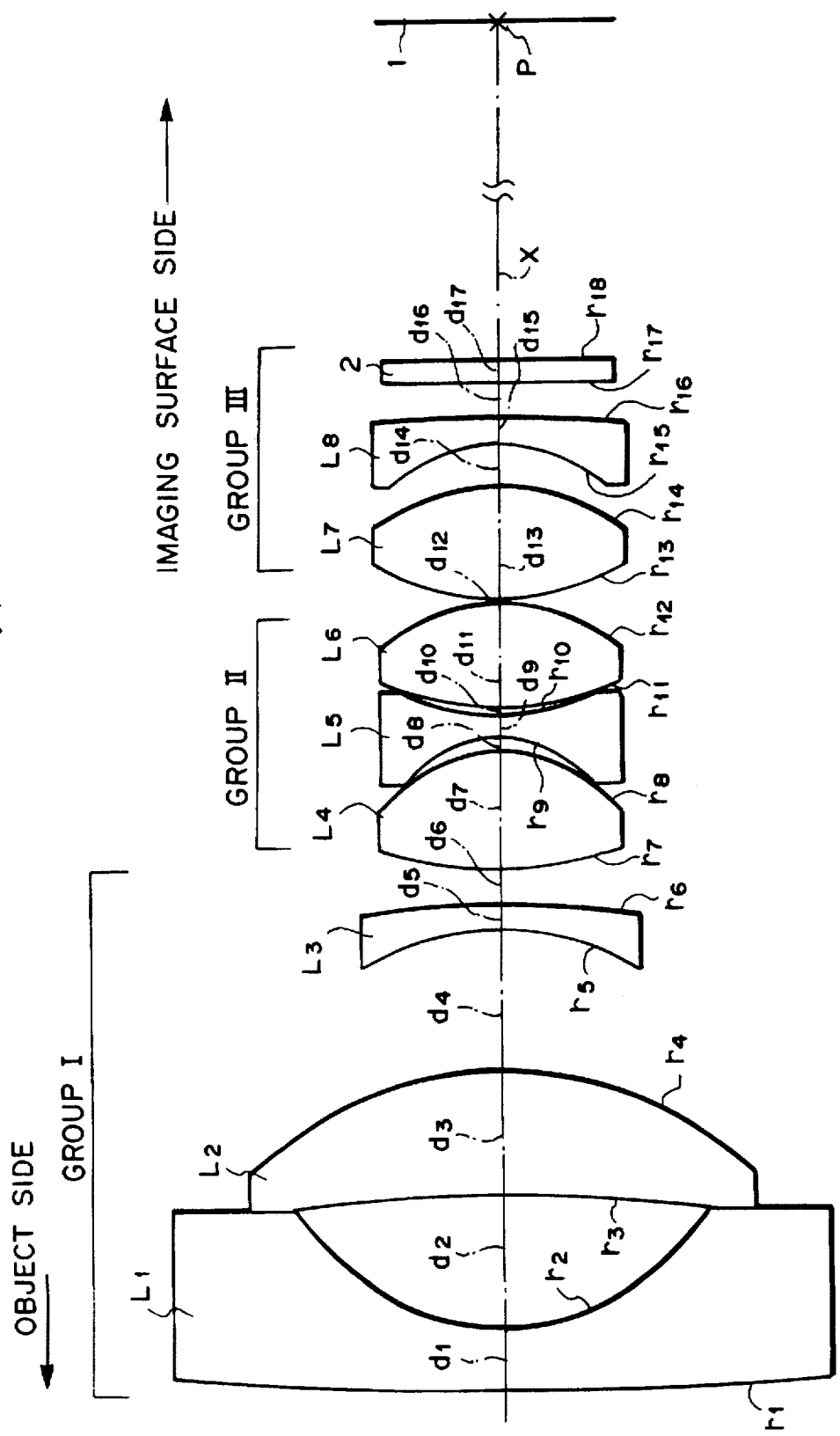
FIG. 1 is a schematic view showing a basic lens configuration in accordance with Embodiment 1 of the present invention.

As shown in FIG. 1, the wide angle imaging lens of this embodiment comprises, successively from the object side, a first lens group in which a negative first lens $L_1$, a positive second lens $L_2$, and a negative third lens $L_3$ are successively disposed from the object side;

a second lens group in which a positive fourth lens $L_4$, a negative fifth lens $L_5$, a positive sixth lens $L_6$ are successively disposed from the object side; and a third lens group in which a positive seventh lens $L_7$ and a negative eighth lens $L_8$ are successively disposed from the object side;

wherein all the above-mentioned lenses are constituted by materials whose difference in dispersion therebetween is smaller than 0.0055 and the following conditional expressions are satisfied:

$$-0.8 < F/F_1 < 0.2 \quad (1)$$

$$0.2 < F_{23}/F_2 < 1.0 \quad (2)$$

$$0.3 < F/f_a < 1.0 \quad (3)$$

$$0.6 < |F/f_b| < 1.5 \quad (4)$$

$$0.2 < F/f_c < 1.0 \quad (5)$$

wherein

F: focal length of the lens system as a whole;

$F_1$: focal length of the first lens group;

$F_2$: focal length of the second lens group;

$F_{23}$: composite focal length of the second lens group and third lens group;

$f_a$: focal length of the positive lens on the object side in the second lens group;

$f_b$: focal length of the negative lens in the second lens group; and $f_c$: focal length of the positive lens on the image side in the second lens group.

Here, an incident luminous flux along an optical axis X from the object side forms an image at an imaging position P on an imaging surface 1. Also, a cover glass 2 of a solid-state image pickup device is disposed on the imaging surface side of the lens system.

Here, the first lens $L_1$ is a negative meniscus lens whose convex surface faces the object; the second lens $L_2$ is a positive meniscus lens whose concave surface faces the object; each of the third lens $L_3$ and the eighth lens $L_8$ is a negative meniscus lens whose concave surface faces the object; each of the fourth lens $L_4$, the sixth lens $L_6$, and the seventh lens $L_7$ is a biconvex lens whose surface with a stronger curvature faces the imaging surface; and the fifth lens $L_5$ is a biconcave lens whose surface with a stronger curvature faces the object.

Next, the above-mentioned conditional expressions (1) to (5) will be explained.

When $F/F_1$ is below the lower limit of conditional expression (1), the negative power of the first lens group becomes so strong that the number of lenses has to be increased in order to correct aberration in the second and third lens groups. When $F/F_1$ exceeds its upper limit, by contrast, the positive power of the first lens group becomes so strong that chromatic aberration are hard to correct in the second and third lens groups, while back focus is shortened. Accordingly, in this embodiment, the value of $F/F_1$ is set to −0.44 as shown in Table 10 (follows) so as to satisfy conditional expression (1), thereby attaining favorable correction of aberration, in particular, such as chromatic aberration. Therefore, the number of the lenses can be reduced, while the surface accuracy of the lenses can be secured.

Also, in this wide angle imaging lens, while the third lens group having a low axial ray height is used for correcting the Petzval sum, when $F_{23}/F_2$ is below the lower limit of the above-mentioned conditional expression (2), the positive power of the second lens group becomes so weak that the Petzval sum increases to an extent where the image surface is hard to correct while the correction of chromatic aberration in the second lens group becomes insufficient. Above the upper limit, by contrast, the positive power of the second lens group becomes so strong that the back focus is shortened, while it becomes difficult to attain a favorable surface accuracy. Accordingly, in this embodiment, the value of $F_{23}/F_2$ is set to 0.56 as shown in Table 10 (follows) so as to satisfy conditional expression (2), thereby attaining favorable correction of aberration, in particular, such as image surface and chromatic aberration, while securing a predetermined back focus length.

Also, while the second lens group mainly corrects chromatic aberration and spherical aberration, beyond the upper limits of conditional expressions (3), (4), and (5), its lens power becomes so strong that the radius of curvature of its lens surface may be too small to secure favorable correction of spherical aberration and surface accuracy easily. Below the lower limits thereof, by contrast, the lens power thereof becomes too weak to sufficiently correct chromatic aberration. Accordingly, in this embodiment, values of $F/f_a$, $|F/f_b|$, and $F/f_c$ are respectively set to 0.75, 1.20, and 0.70 as shown in Table 10 (follows) so as to satisfy conditional expressions (3), (4), and (5), thereby attaining favorable correction of aberration, in particular, such as spherical aberration and chromatic aberration, while making it possible to secure the surface accuracy of the lenses.

Also, while crystals of fluorite, quartz, and the like having favorable light transmittance ratios in ultraviolet region can be used as materials for forming lenses, even when the lenses are formed by such lens forming materials having a small difference in dispersion therebetween, various kinds of aberration can be ameliorated.

Further, since, as the material for forming each lens, a material having a light transmittance of 50% or higher with respect to light having a wavelength of 300 to 800 nm when the material has a thickness of 10 mm is selected, the lenses can be suitably used within the range from ultraviolet region to visible light region.

As is mentioned in the latter Table 1 shows radius of curvature r (mm) of each lens surface, center thickness of each lens and air gap between neighboring lenses d (mm), and refractive index N of each lens at i-line.

Here, the numbers in Table 1 and Tables 2 to 9, which will be explained later, identifying the marks r, d, and N successively increase from the object side.

Also, in this embodiment, F number and field angle 2ω of the wide angle imaging lens are 2.57 and 81.0°, respectively.

Embodiment 2

The imaging lens of Embodiment 2 will be explained with reference to FIG. 2.

The wide angle imaging lens of Embodiment 2 has an eight-lens configuration which is substantially the same as that of the wide angle imaging lens of the above-mentioned Embodiment 1 but mainly differs therefrom in that the first lens $L_1$ is a biconcave lens, that the second lens $L_2$ is a biconvex lens, and that the eighth lens $L_8$ is a biconcave lens.

Here, all of the above-mentioned conditional expressions (1) to (5) are satisfied, while their respective values are set as shown in Table 10 (follows).

In this embodiment, F number and field angle 2ω of the wide angle imaging are 2.54° and 80.8°, respectively.

As is mentioned in the latter Table 2 shows radius of curvature r (mm) of each lens surface, center thickness of each lens and air gap between neighboring lenses d (mm), and refractive index N of each lens at i-line in this embodiment.

Embodiment 3

Figure 3:
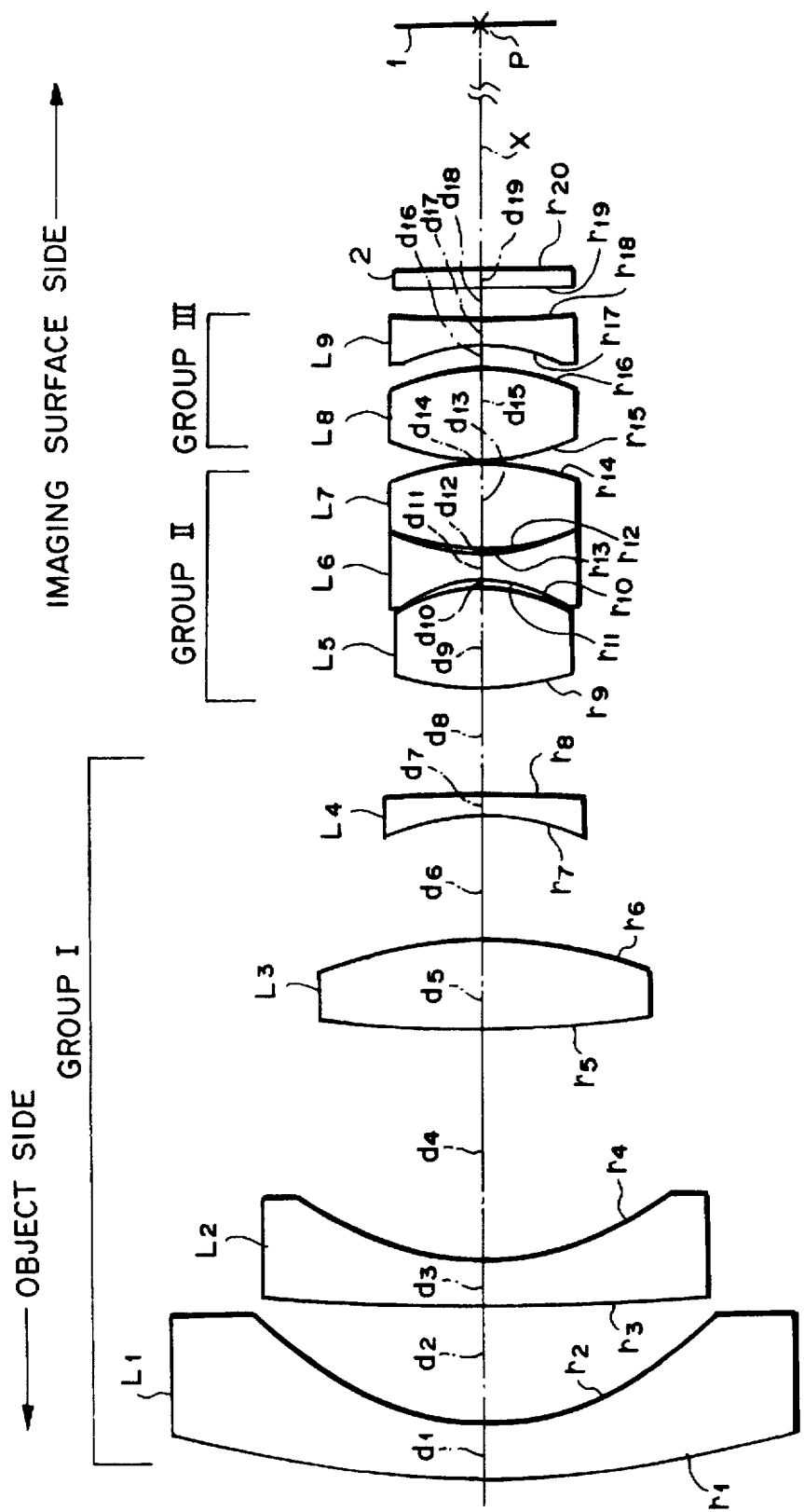
FIG. 3 is a schematic view showing a basic lens configuration in accordance with Embodiment 3 of the present invention.

The wide angle imaging lens of Embodiment 3 will be explained with reference to FIG. 3.

The wide angle imaging lens of Embodiment 3 has a lens configuration which is substantially the same as that of the wide angle imaging lens of the above-mentioned Embodiment 2 but mainly differs therefrom in that the first lens group is constituted by four sheets of lenses $L_1$ to $L_4$.

Here, all of the above-mentioned conditional expressions (1) to (5) are satisfied, while their respective values are set as shown in Table 10 (follows).

In this embodiment, F number and field angle 2ω of the imaging lens are 2.42° and 83.6°, respectively.

As is mentioned in the latter Table 3 shows radius of curvature r (mm) of each lens surface, center thickness of each lens and air gap between neighboring lenses d (mm), and refractive index N of each lens at i-line in this embodiment.

Embodiment 4

Figure 4:
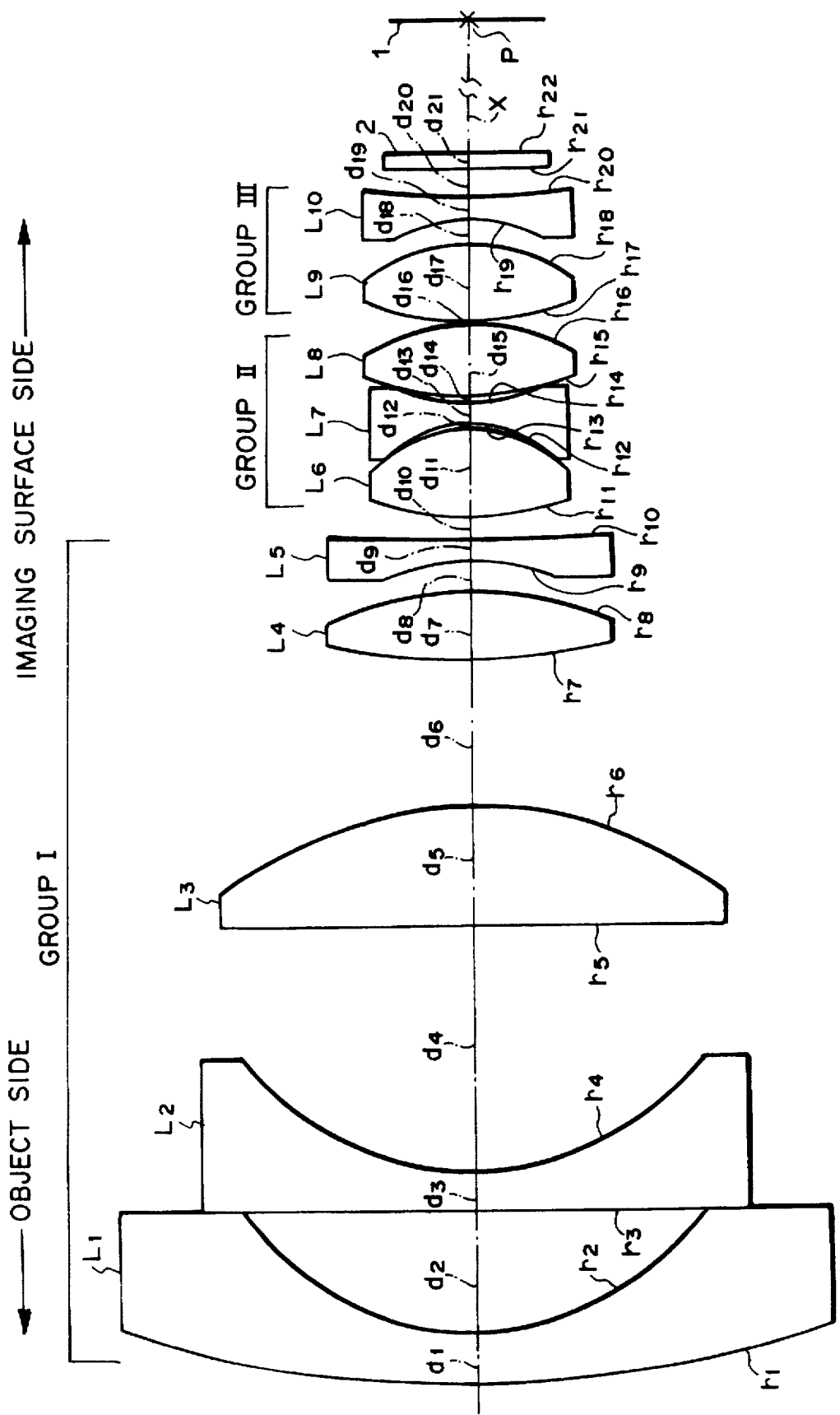
FIG. 4 is a schematic view showing a basic lens configuration in accordance with Embodiment 4 of the present invention.

The wide angle imaging lens of Embodiment 4 will be explained with reference to FIG. 4.

The wide angle imaging lens of Embodiment 4 has a configuration substantially the same as that of the wide angle imaging lens of the above-mentioned Embodiment 2 but mainly differs therefrom in that the first lens group is constituted by five sheets of lenses $L_1$ to $L_5$, thereby having 10 sheets of lenses in total.

Here, all of the above-mentioned conditional expressions (1) to (5) are satisfied, while their respective values are set as shown in Table 10 (follows).

In this embodiment, F number and field angle 2ω of the wide angle imaging lens are 2.05° and 82.6°, respectively.

As is mentioned in the latter Table 4 shows radius of curvature r (mm) of each lens surface, center thickness of each lens and air gap between neighboring lenses d (mm), and refractive index N of each lens at i-line in this embodiment.

Embodiment 5

Figure 5:
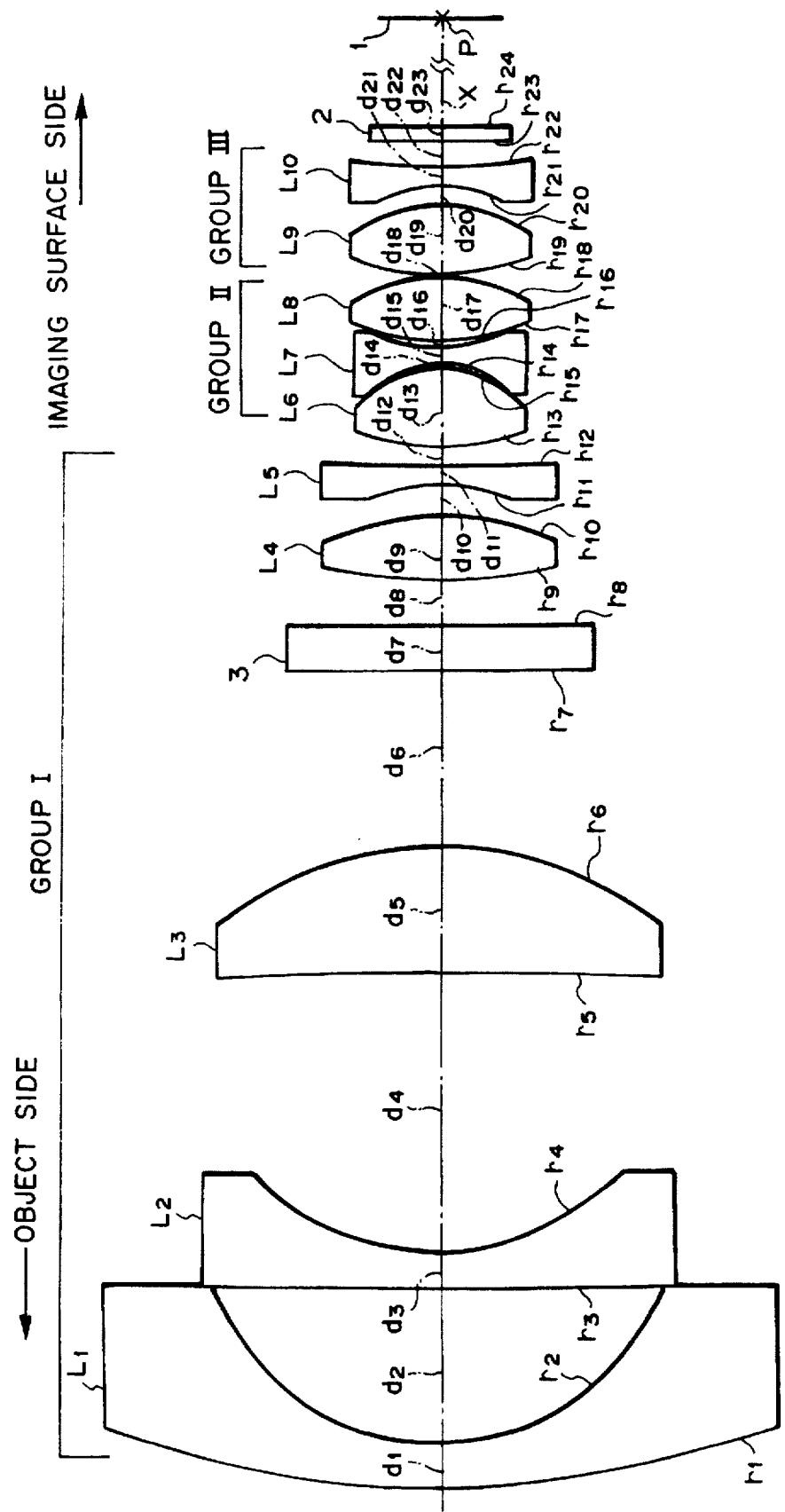
FIG. 5 is a schematic view showing a basic lens configuration in accordance with Embodiment 5 of the present invention.

The wide angle imaging lens of Embodiment 5 will be explained with reference to FIG. 5.

The wide angle imaging lens of Embodiment 5 has a configuration substantially the same as that of the above-mentioned Embodiment 2 but mainly differs therefrom in that the first lens group is constituted by five sheets of lenses $L_1$ to $L_5$ and a band path filter 3.

Here, all of the above-mentioned conditional expressions (1) to (5) are satisfied, while their respective values are set as shown in Table 10 (follows).

In this embodiment, F number and field angle 2ω of the wide angle imaging lens are 2.07° and 92.8°, respectively.

As is mentioned in the latter Table 5 shows radius of curvature r (mm) of each lens surface, center thickness of each lens and air gap between neighboring lenses d (mm), and refractive index N of each lens at i-line in this embodiment.

Embodiment 6

Figure 6:
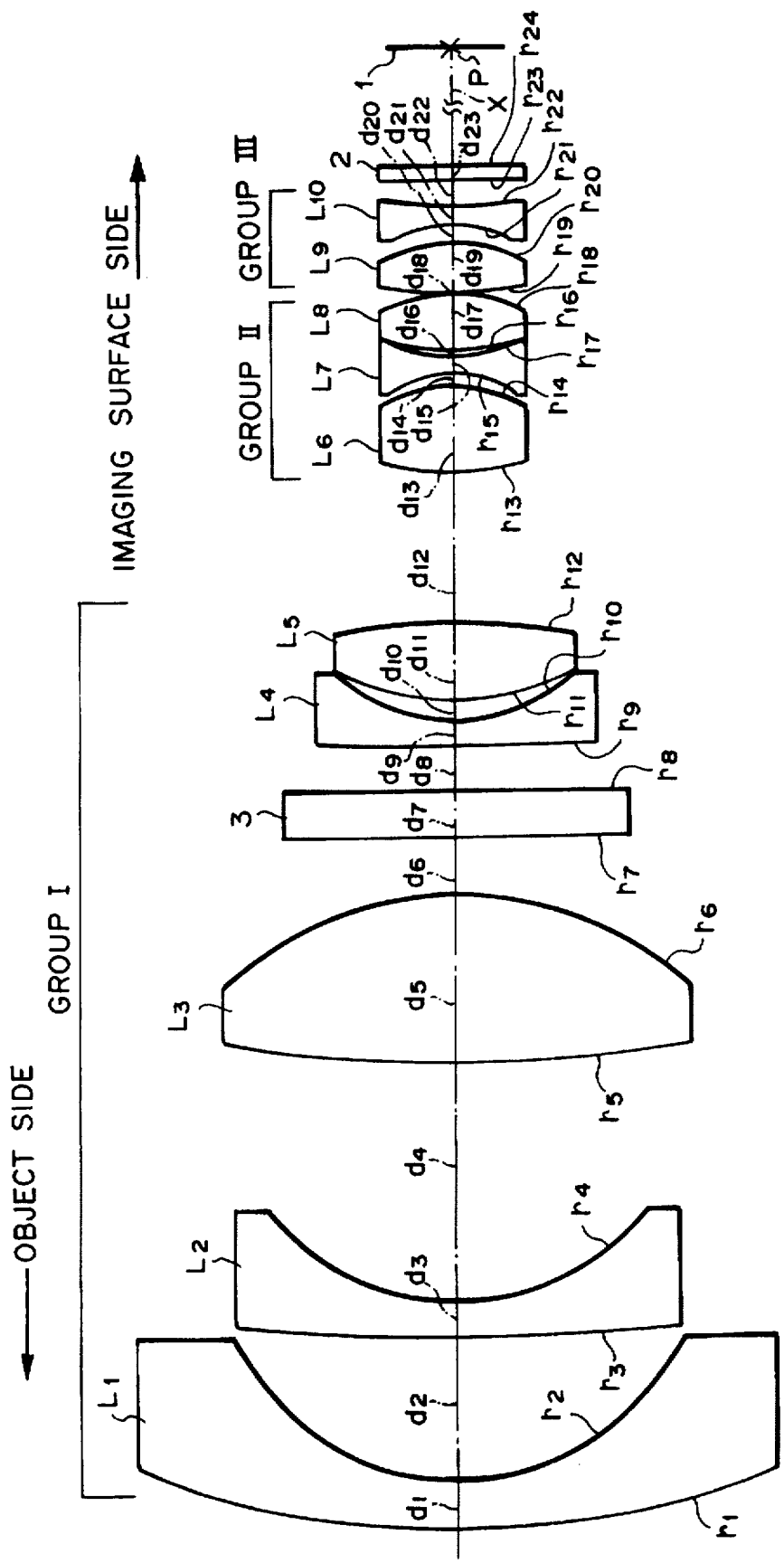
FIG. 6 is a schematic view showing a basic lens configuration in accordance with Embodiment 6 of the present invention.

The wide angle imaging lens of Embodiment 6 will be explained with reference to FIG. 6.

The wide angle imaging lens of Embodiment 6 has a configuration substantially the same as that of the wide angle imaging lens of the above-mentioned Embodiment 5 but mainly differs therefrom in the forms of the fourth lens $L_4$ and fifth lens $L_5$.

Here, all of the above-mentioned conditional expressions (1) to (5) are satisfied, while their respective values are set as shown in Table 10 (follows).

Also, in this embodiment, F number and field angle 2ω of the wide angle imaging lens are 2.03° and 85.0°, respectively.

As is mentioned in the latter Table 6 shows radius of curvature r (mm) of each lens surface, center thickness of each lens and air gap between neighboring lenses d (mm), refractive index N of each lens at i-line in this embodiment.

Embodiment 7

Figure 7:
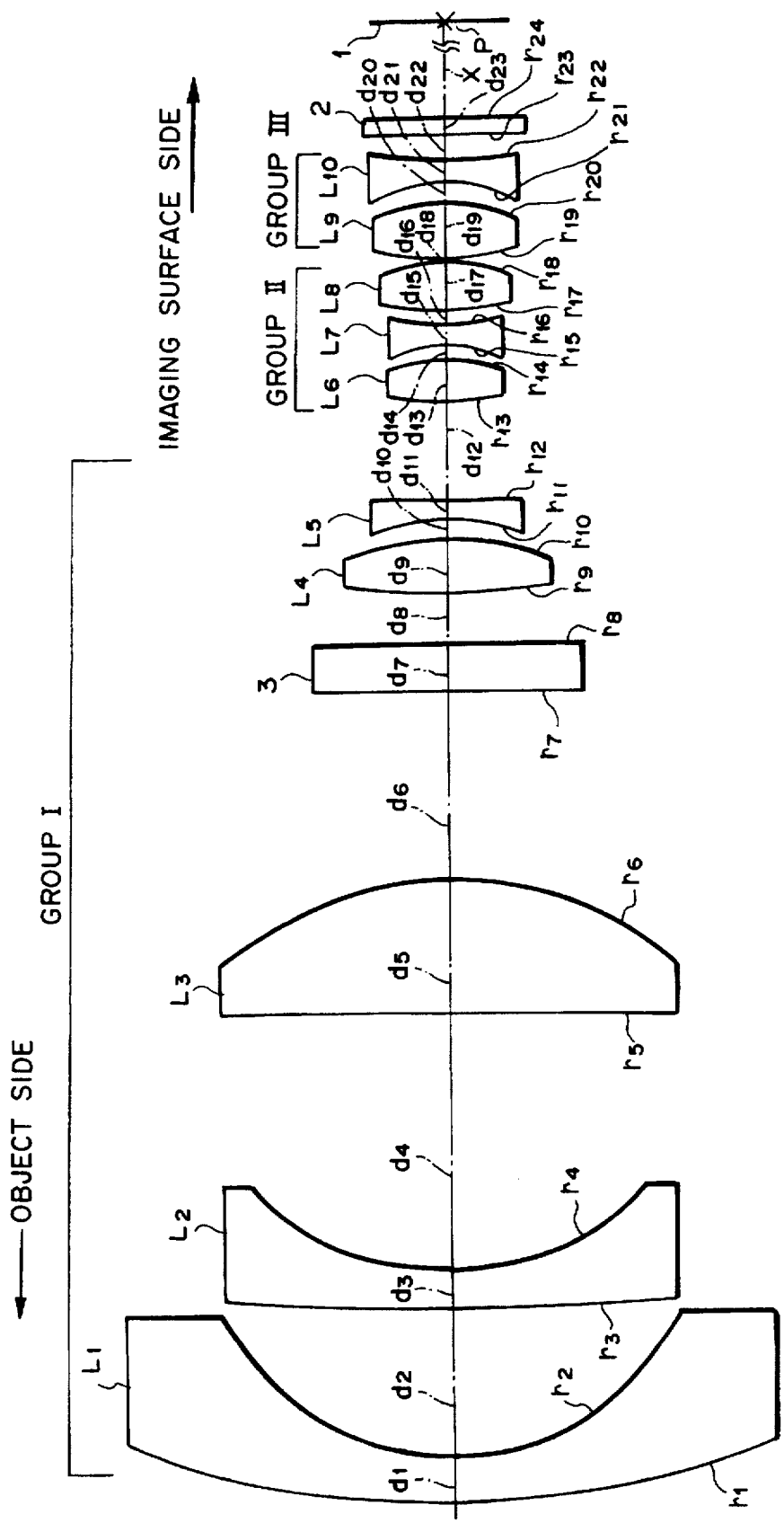
FIG. 7 is a schematic view showing a basic lens configuration in accordance with Embodiment 7 of the present invention.

The wide angle imaging lens of Embodiment 7 will be explained with reference to FIG. 7.

The wide angle imaging lens of Embodiment 7 has a lens configuration which is substantially the same as that of the wide angle imaging lens of the above-mentioned Embodiment 5.

Here, all of the above-mentioned conditional expressions (1) to (5) are satisfied, while their respective values are set as shown in Table 10 (follows).

In this embodiment, F number and field angle 2ω of the wide angle imaging lens are 2.50° and 83.8°, respectively.

As is mentioned in the latter Table 7 shows radius of curvature r (mm) of each lens surface, center thickness of each lens and air gap between neighboring lenses d (mm), and refractive index N of each lens at i-line in this embodiment.

Embodiment 8

Figure 8:
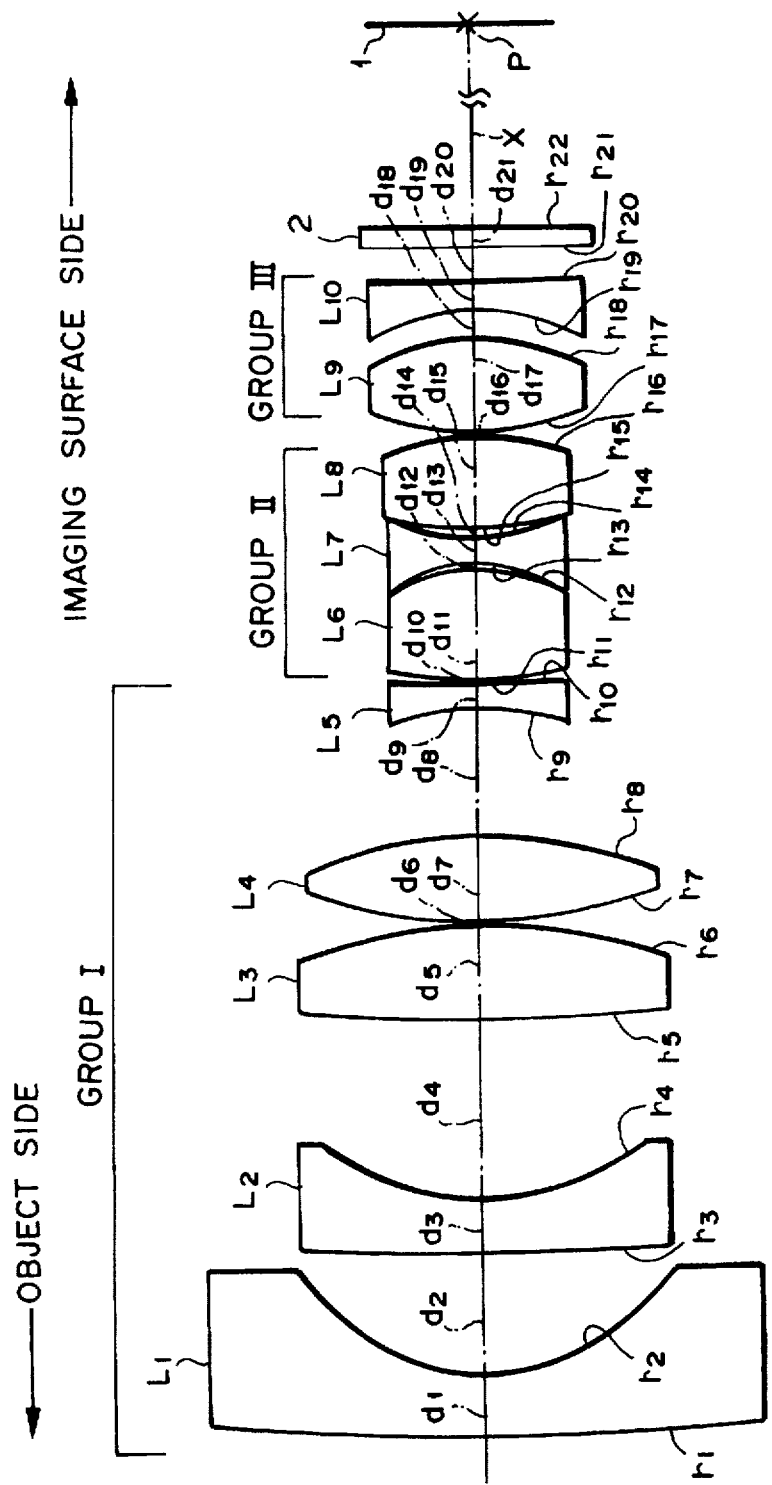
FIG. 8 is a schematic view showing a basic lens configuration in accordance with Embodiment 8 of the present invention.

The wide angle imaging lens of Embodiment 8 will be explained with reference to FIG. 8.

The wide angle imaging lens of Embodiment 8 has a lens configuration which is substantially the same as that of the wide angle imaging lens of the above-mentioned Embodiment 4.

Here, all of the above-mentioned conditional expressions (1) to (5) are satisfied, while their respective values are set as shown in Table 10 (follows).

Also, in this embodiment, F number and field angle 2ω of the imaging lens are 2.05° and 83.4°, respectively.

As is mentioned in the latter Table 8 shows radius of curvature r (mm) of each lens surface, center thickness of each lens and air gap between neighboring lenses d (mm), and refractive index N of each lens at i-line in this embodiment.

Embodiment 9

Figure 9:
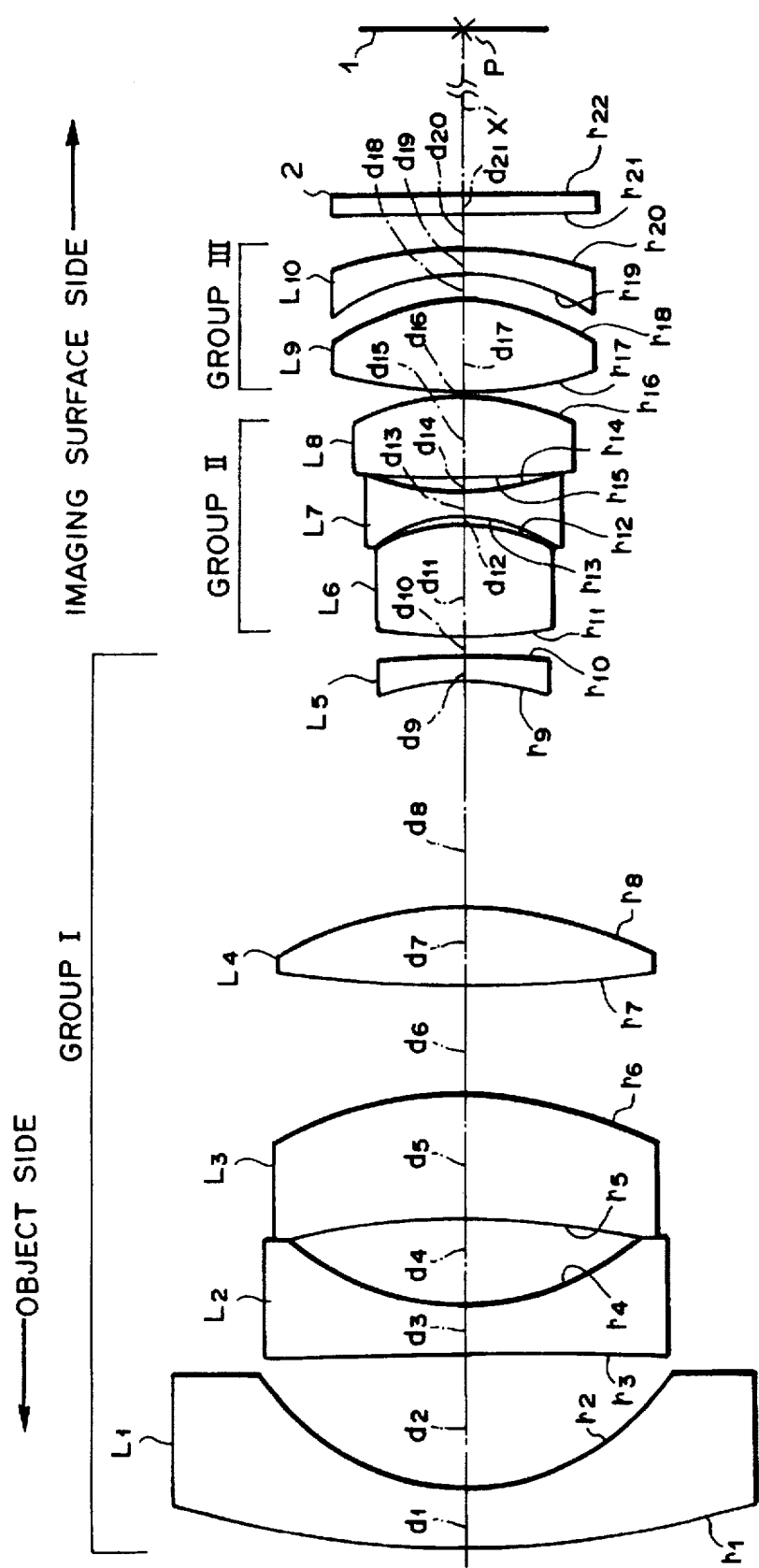
FIG. 9 is a schematic view showing a basic lens configuration in accordance with Embodiment 9 of the present invention.
Figures 11A, 11B, 11C, 11D:
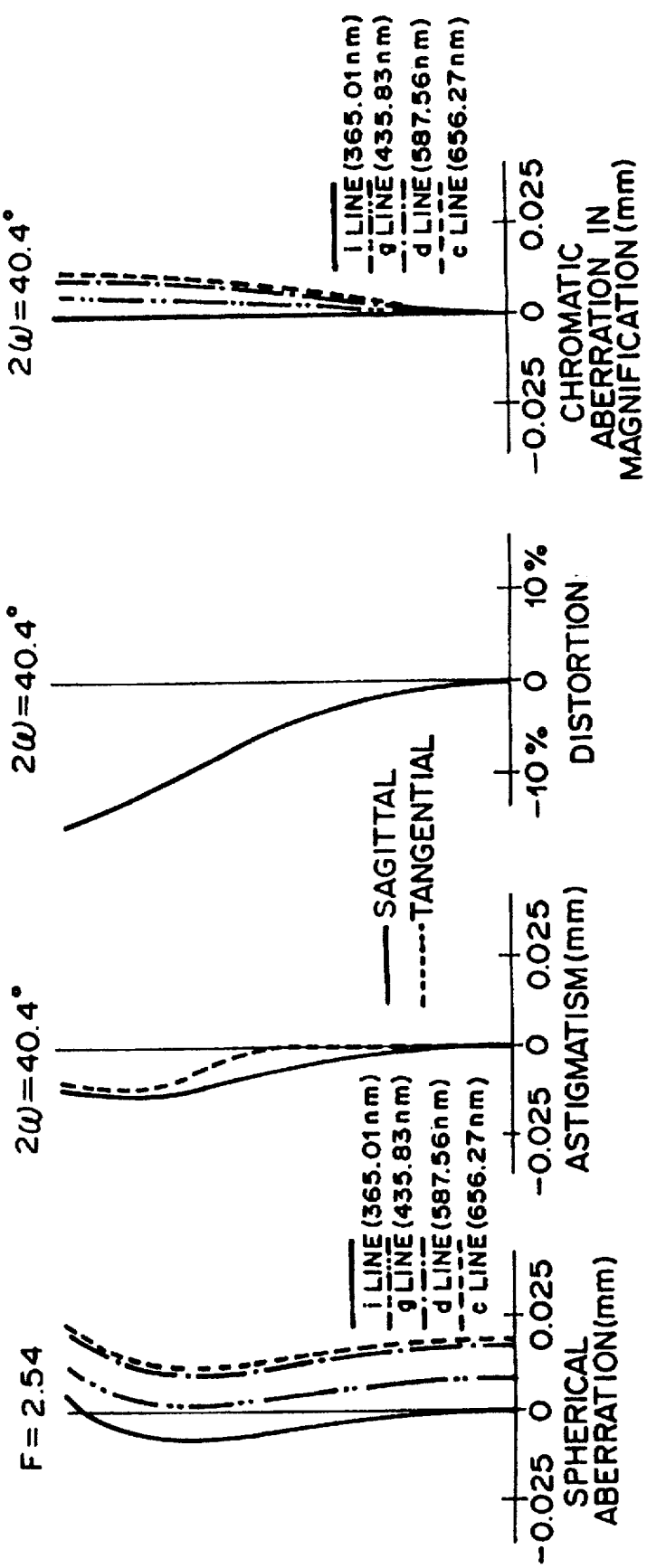
FIG. 11 is an aberration chart of the lens in accordance with Embodiment 2.
Figures 13A, 13B, 13C, 13D:
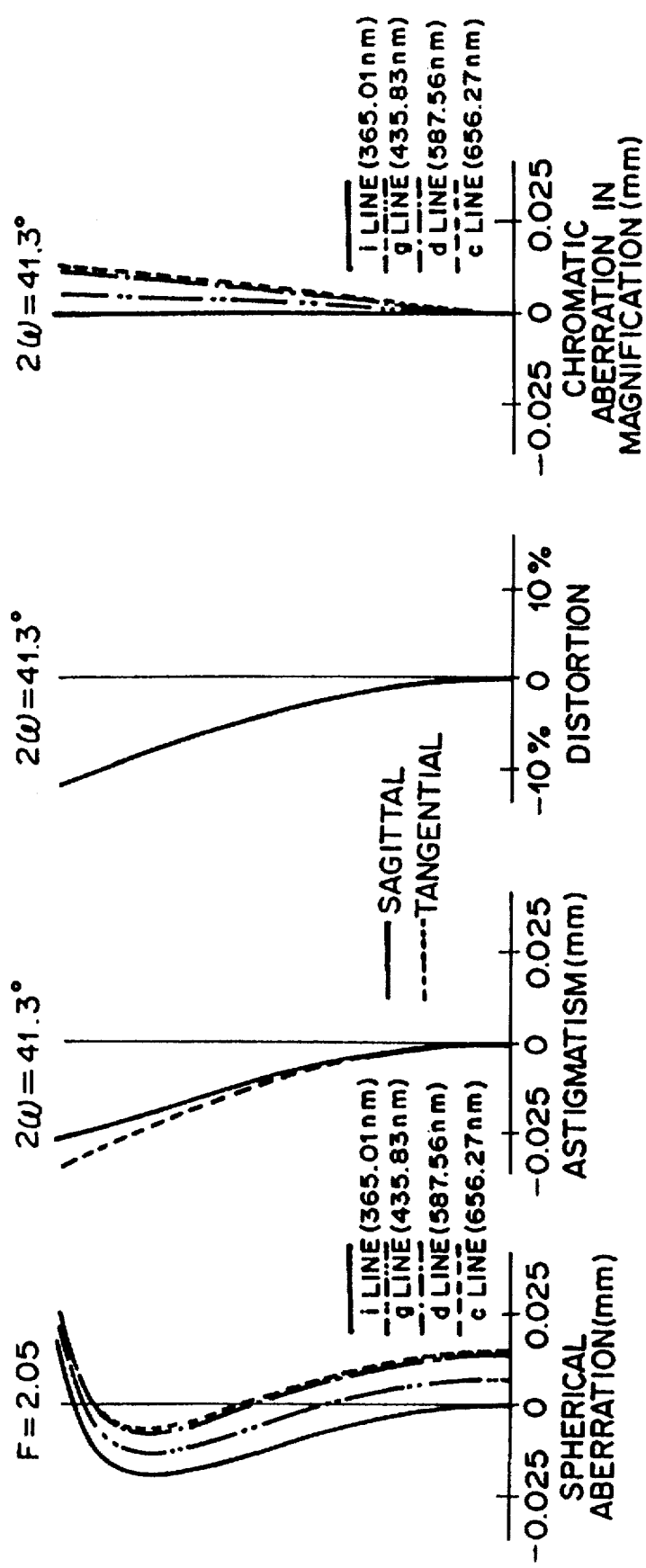
FIG. 13 is an aberration chart of the lens in accordance with Embodiment 4.
Figures 16A, 16B, 16C, 16D:
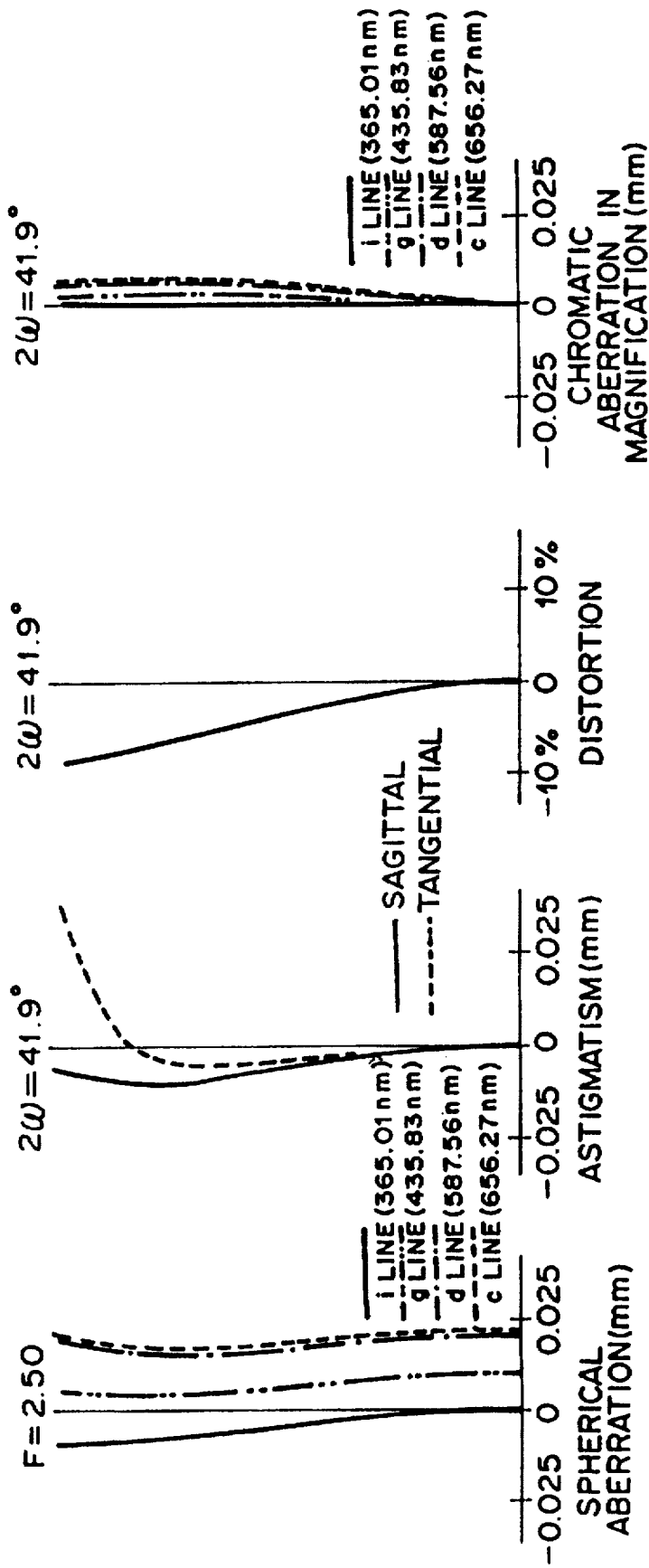
FIG. 16 is an aberration chart of the lens in accordance with Embodiment 7.
Figures 17A, 17B, 17C, 17D:
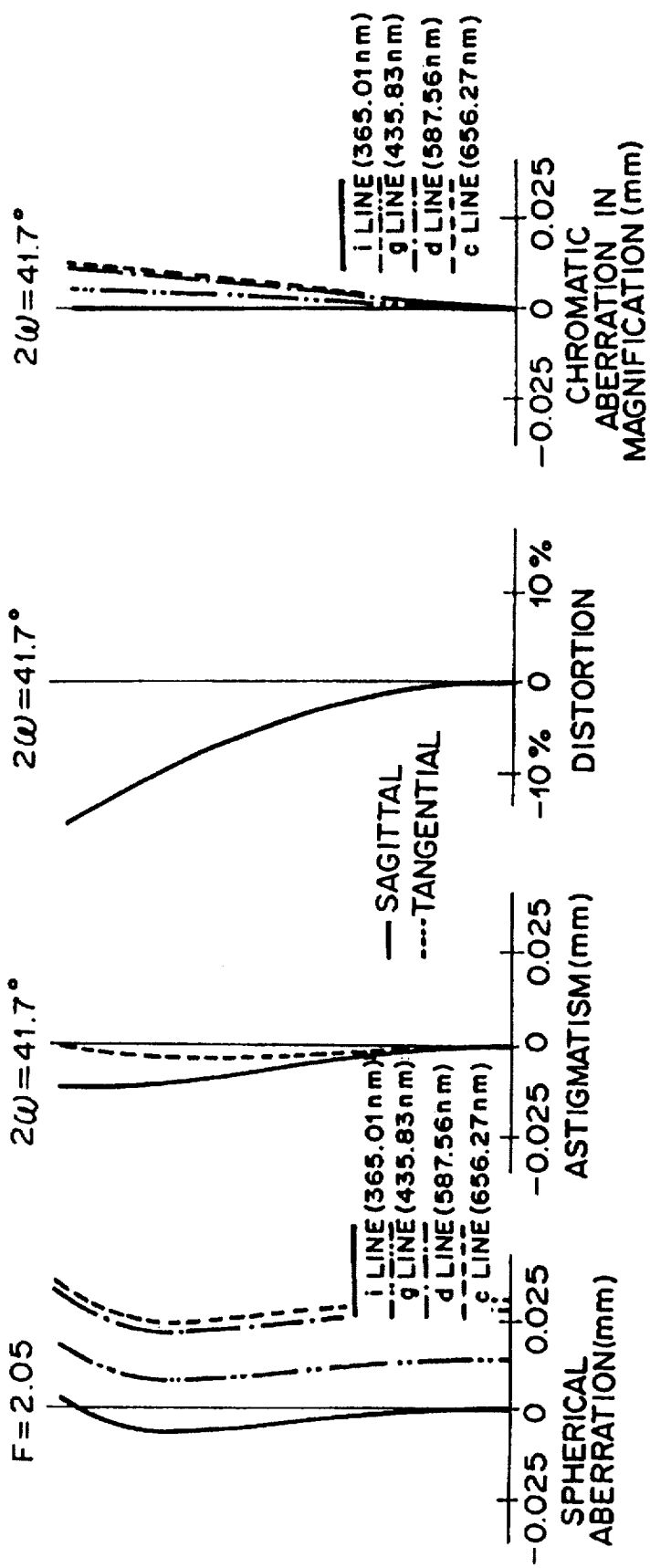
FIG. 17 is an aberration chart of the lens in accordance with Embodiment 8.

The wide angle imaging lens of Embodiment 9 will be explained with reference FIG. 9.

The wide angle imaging lens of Embodiment 9 has a lens configuration which is substantially the same as that of the wide angle imaging lens of the above-mentioned Embodiment 8 but mainly differs therefrom in that the third lens $L_3$ is a positive meniscus lens whose convex surface faces the imaging surface.

Here, all of the above-mentioned conditional expressions (1) to (5) are satisfied, while their respective values are set as shown in Table 10 (follows).

Also, in this embodiment, F number and field angle 2ω of the imaging lens are 2.05° and 79.0°, respectively.

As is mentioned in the latter Table 9 shows radius of curvature r (mm) of each lens surface, center thickness of each lens and air gap between neighboring lenses d (mm), and refractive index N of each lens at i-line in this embodiment.

FIGS. 10 to 18 show aberration charts (for spherical aberration, astigmatism, distortion, and chromatic aberration in magnification) corresponding to Embodiments 1 to 9, respectively. In each aberration chart, ω indicates a half field angle. As can be seen from FIGS. 10 to 18, all of the above-mentioned various kinds of aberration can be ameliorated in accordance with the foregoing embodiments.

Each chart for spherical aberration and chromatic aberration in magnification shows aberrations with respect to i-line, g-line, e-line, and C-line. Also, each chart for astigmatism shows aberrations with respect to sagittal (S) image surface and tangential (T) image surface. Here, curves in graphs concerning spherical aberration, astigmatism, and chromatic aberration in magnification are explained at predetermined positions in each chart.

FIG. 19 is a graph showing transmittance characteristics of fluorite and quartz. In addition to these materials, this graph shows transmittance characteristics of BK-7 and F-2 which are typical lens glass materials. Fluorite and quartz used in the foregoing embodiments both have favorable transmittance characteristics in ultraviolet region such that their transmittance ratio becomes 80% or higher at a wavelength of 300 to 400 nm when their thickness is 10 mm. Also, while not depicted in FIG. 19, they have a transmittance of 80% or higher with respect to light having a wavelength of 400 to 800 nm as well. In practice, a lens which can be suitably used within the range from ultraviolet region to visible light region can be made of a material having a transmittance of 50% or higher at a wavelength of 300 to 800 nm.

Also, in general, correction of chromatic aberration becomes harder as the difference in dispersion between a plurality of kinds of lens materials constituting the lens system is smaller. While the difference in dispersion between BK-7 and F-2, which are most popular lens materials, is about 0.0090, correction of chromatic aberration becomes quite difficult when the difference in dispersion is smaller than 0.0055.

In the case of fluorite (with a dispersion of 0.004567) and quartz (with a dispersion of 0.006760) used in the embodiments, their difference in dispersion is about 0.0022 which is quite small. Nevertheless, even under such a condition where chromatic aberration is hard to correct, the imaging lenses of the foregoing embodiments can correct chromatic aberration sufficiently well, while favorably correcting other kinds of aberration, thereby exhibiting excellent characteristics.

Here, without being restricted to the above-mentioned embodiments, the wide angle imaging lens of the present invention can be modified in various manners. For example, the curvature r and lens distance (or lens thickness) d of each lens can be appropriately changed. Also, when necessary, a brightness stop may be disposed within the lens system, for example, at a position just in front of the second lens group.

Also, lens materials other than fluorite and quartz can be used for forming the wide angle imaging lens of the present invention so as to favorably correct various kinds of aberration as long as these plurality of kinds of lens materials satisfy conditional expressions (1) to (5) while their difference in dispersion is smaller than 0.0055.

As explained in detail in the foregoing, in accordance with the wide angle imaging lens of the present invention, a high brightness and a wide field angle can be obtained while using lens materials whose difference in dispersion therebetween is small. Also, chromatic aberration can be favorably corrected, while the Petzval sum can be kept sufficiently low so as to favorably correct the image surface. Accordingly, various kinds of aberration can be favorably corrected.

Therefore, even when lens materials having a small difference in dispersion therebetween, though with a favorable transmittance in ultraviolet region, such as quartz and fluorite, are used, a wide angle imaging lens exhibiting a favorable characteristic can be formed.

TABLE 1

| m | r | d | N |
|---|---|---|---|
| 1 | 29.47 | 0.333 | 1.4745 |
| 2 | 1.246 | 0.710 | |
| 3 | −8.003 | 0.680 | 1.4745 |
| 4 | −1.881 | 0.748 | |
| 5 | −1.420 | 0.133 | 1.4745 |
| 6 | −5.410 | 0.200 | |
| 7 | 1.975 | 0.645 | 1.4449 |
| 8 | −0.767 | 0.070 | |
| 9 | −0.612 | 0.133 | 1.4745 |
| 10 | 1.211 | 0.034 | |
| 11 | 1.628 | 0.573 | 1.4449 |
| 12 | −0.934 | 0.013 | |
| 13 | 1.342 | 0.587 | 1.4449 |
| 14 | −1.139 | 0.197 | |
| 15 | −0.896 | 0.133 | 1.4745 |
| 16 | −10.97 | 0.200 | |
| 17 | ∞ | 0.100 | 1.4745 |
| 18 | ∞ | | |

TABLE 2

| m | r | d | N |
|---|---|---|---|
| 1 | −35.99 | 0.328 | 1.4745 |
| 2 | 1.306 | 1.155 | |
| 3 | 98.31 | 0.800 | 1.4745 |
| 4 | −1.852 | 0.847 | |
| 5 | −1.319 | 0.131 | 1.4745 |
| 6 | −5.435 | 0.463 | |
| 7 | 1.736 | 0.565 | 1.4449 |
| 8 | −0.813 | 0.057 | |
| 9 | −0.687 | 0.144 | 1.4745 |
| 10 | 1.183 | 0.013 | |
| 11 | 1.432 | 0.525 | 1.4449 |
| 12 | −1.142 | 0.013 | |
| 13 | 1.293 | 0.578 | 1.4449 |
| 14 | −1.137 | 0.194 | |
| 15 | −0.906 | 0.131 | 1.4745 |
| 16 | 9.194 | 0.200 | |
| 17 | ∞ | 0.100 | 1.4745 |
| 18 | ∞ | | |

TABLE 3

| m | r | d | N |
|---|---|---|---|
| 1 | 6.388 | 0.334 | 1.4745 |
| 2 | 1.690 | 0.650 | |
| 3 | 13.26 | 0.267 | 1.4745 |
| 4 | 1.675 | 1.324 | |
| 5 | 6.699 | 0.505 | 1.4745 |
| 6 | −2.426 | 0.707 | |
| 7 | −1.371 | 0.133 | 1.4745 |
| 8 | −10.26 | 0.606 | |
| 9 | 1.670 | 0.574 | 1.4449 |
| 10 | −0.877 | 0.043 | |
| 11 | −0.785 | 0.147 | 1.4745 |
| 12 | 1.104 | 0.029 | |
| 13 | 1.468 | 0.467 | 1.4449 |
| 14 | −1.377 | 0.013 | |
| 15 | 1.366 | 0.501 | 1.4449 |
| 16 | −1.089 | 0.127 | |
| 17 | −0.998 | 0.133 | 1.4745 |
| 18 | 5.881 | 0.200 | |
| 19 | ∞ | 0.100 | 1.4745 |
| 20 | ∞ | | |

TABLE 4

| m | r | d | N |
|---|---|---|---|
| 1 | 7.567 | 0.354 | 1.4745 |
| 2 | 1.895 | 0.816 | |
| 3 | 59.76 | 0.283 | 1.4745 |
| 4 | 1.941 | 1.726 | |
| 5 | −123.8 | 0.820 | 1.4745 |
| 6 | −2.731 | 0.996 | |
| 7 | 3.883 | 0.482 | 1.4449 |
| 8 | −2.160 | 0.205 | |
| 9 | −1.422 | 0.142 | 1.4745 |
| 10 | 52.56 | 0.156 | |
| 11 | 1.918 | 0.609 | 1.4449 |
| 12 | −0.872 | 0.018 | |
| 13 | −0.820 | 0.156 | 1.4745 |
| 14 | 1.202 | 0.036 | |
| 15 | 1.750 | 0.496 | 1.4449 |
| 16 | −1.351 | 0.014 | |
| 17 | 1.927 | 0.531 | 1.4449 |
| 18 | −1.133 | 0.177 | |
| 19 | −0.986 | 0.142 | 1.4745 |
| 20 | 4.711 | 0.200 | |
| 21 | ∞ | 0.100 | 1.4745 |
| 22 | ∞ | | |

TABLE 5

| m | r | d | N |
|---|---|---|---|
| 1 | 8.526 | 0.398 | 1.4745 |
| 2 | 2.151 | 1.312 | |
| 3 | 88.08 | 0.318 | 1.4745 |
| 4 | 2.206 | 2.521 | |
| 5 | −68.94 | 1.113 | 1.4745 |
| 6 | −3.045 | 1.534 | |
| 7 | ∞ | 0.398 | 1.4745 |
| 8 | ∞ | 0.398 | |
| 9 | 4.596 | 0.541 | 1.4449 |
| 10 | −2.447 | 0.277 | |
| 11 | −1.545 | 0.159 | 1.4745 |
| 12 | 63.72 | 0.175 | |
| 13 | 2.212 | 0.684 | 1.4449 |
| 14 | −0.971 | 0.024 | |
| 15 | −0.908 | 0.159 | 1.4745 |
| 16 | 1.372 | 0.045 | |
| 17 | 2.023 | 0.557 | 1.4449 |
| 18 | −1.511 | 0.016 | |
| 19 | 2.275 | 0.597 | 1.4449 |
| 20 | −1.242 | 0.200 | |
| 21 | −1.089 | 0.159 | 1.4745 |
| 22 | 5.380 | 0.200 | |
| 23 | ∞ | 0.100 | 1.4745 |
| 24 | ∞ | | |

TABLE 6

| m | r | d | N |
|---|---|---|---|
| 1 | 7.380 | 0.376 | 1.4745 |
| 2 | 2.045 | 1.163 | |
| 3 | 16.08 | 0.301 | 1.4745 |
| 4 | 1.987 | 2.013 | |
| 5 | 10.32 | 1.367 | 1.4745 |
| 6 | −2.826 | 0.474 | |
| 7 | ∞ | 0.376 | 1.4745 |
| 8 | ∞ | 0.376 | |
| 9 | 55.56 | 0.196 | 1.4745 |
| 10 | 1.385 | 0.175 | |
| 11 | 2.009 | 0.652 | 1.4449 |
| 12 | −4.857 | 1.228 | |
| 13 | 2.188 | 0.674 | 1.4449 |
| 14 | −1.110 | 0.097 | |
| 15 | −0.860 | 0.150 | 1.4745 |
| 16 | 1.357 | 0.035 | |

TABLE 6-continued

| m | r | d | N |
|---|---|---|---|
| 17 | 1.844 | 0.453 | 1.4449 |
| 18 | −1.198 | 0.015 | |
| 19 | 2.523 | 0.421 | 1.4449 |
| 20 | −1.093 | 0.168 | |
| 21 | −0.952 | 0.150 | 1.4745 |
| 22 | 3.668 | 0.200 | |
| 23 | ∞ | 0.100 | 1.4745 |
| 24 | ∞ | | |

TABLE 7

| m | r | d | N |
|---|---|---|---|
| 1 | 6.922 | 0.373 | 1.4745 |
| 2 | 1.969 | 1.192 | |
| 3 | 23.93 | 0.298 | 1.4745 |
| 4 | 2.127 | 2.629 | |
| 5 | −128.6 | 1.054 | 1.4745 |
| 6 | −2.656 | 1.491 | |
| 7 | ∞ | 0.373 | 1.4745 |
| 8 | ∞ | 0.373 | |
| 9 | 4.541 | 0.439 | 1.4449 |
| 10 | −1.968 | 0.147 | |
| 11 | −1.449 | 0.149 | 1.4745 |
| 12 | 32.51 | 0.758 | |
| 13 | 2.164 | 0.337 | 1.4449 |
| 14 | −1.073 | 0.114 | |
| 15 | −0.819 | 0.149 | 1.4745 |
| 16 | 1.325 | 0.127 | |
| 17 | 1.856 | 0.399 | 1.4449 |
| 18 | −1.157 | 0.015 | |
| 19 | 2.144 | 0.447 | 1.4449 |
| 20 | −1.124 | 0.165 | |
| 21 | −0.933 | 0.149 | 1.4745 |
| 22 | 4.872 | 0.200 | |
| 23 | ∞ | 0.100 | 1.4745 |
| 24 | ∞ | | |

TABLE 8

| m | r | d | N |
|---|---|---|---|
| 1 | 13.51 | 0.341 | 1.4745 |
| 2 | 1.206 | 0.646 | |
| 3 | 60.48 | 0.273 | 1.4745 |
| 4 | 1.460 | 0.945 | |
| 5 | 9.194 | 0.507 | 1.4745 |
| 6 | −2.779 | 0.028 | |
| 7 | 2.757 | 0.464 | 1.4449 |
| 8 | −2.316 | 0.669 | |
| 9 | −1.618 | 0.136 | 1.4745 |
| 10 | −22.83 | 0.000 | |
| 11 | 2.230 | 0.586 | 1.4449 |
| 12 | −0.879 | 0.023 | |
| 13 | −0.816 | 0.150 | 1.4745 |
| 14 | 1.121 | 0.044 | |
| 15 | 2.199 | 0.477 | 1.4449 |
| 16 | −1.341 | 0.014 | |
| 17 | 1.560 | 0.511 | 1.4449 |
| 18 | −1.101 | 0.155 | |
| 19 | −1.080 | 0.136 | 1.4745 |
| 20 | 44.03 | 0.200 | |
| 21 | ∞ | 0.100 | 1.4745 |
| 22 | ∞ | | |

TABLE 9

| m | r | d | N |
|---|---|---|---|
| 1 | 5.448 | 0.354 | 1.4745 |
| 2 | 1.362 | 0.774 | |
| 3 | −67.69 | 0.283 | 1.4745 |
| 4 | 1.499 | 0.496 | |
| 5 | −4.428 | 0.701 | 1.4745 |
| 6 | −2.219 | 0.625 | |
| 7 | 6.153 | 0.481 | 1.4745 |
| 8 | −2.065 | 1.293 | |
| 9 | −1.476 | 0.142 | 1.4745 |
| 10 | −7.337 | 0.115 | |
| 11 | 2.745 | 0.608 | 1.4449 |
| 12 | −0.948 | 0.038 | |
| 13 | −0.834 | 0.156 | 1.4745 |
| 14 | 1.524 | 0.068 | |
| 15 | 4.915 | 0.495 | 1.4449 |
| 16 | −1.248 | 0.014 | |
| 17 | 2.308 | 0.531 | 1.4449 |
| 18 | −1.195 | 0.150 | |
| 19 | −1.173 | 0.142 | 1.4745 |
| 20 | −2.432 | 0.200 | |
| 21 | ∞ | 0.100 | 1.4745 |
| 22 | ∞ | | |

TABLE 10

| Expressions | Embod. 1 | Embod. 2 | Embod. 3 | Embod. 4 | Embod. 5 |
|---|---|---|---|---|---|
| (1) | −0.44 | −0.38 | −0.55 | −0.08 | −0.05 |
| (2) | 0.56 | 0.59 | 0.60 | 0.68 | 0.69 |
| (3) | 0.75 | 0.75 | 0.72 | 0.69 | 0.62 |
| (4) | 1.20 | 1.12 | 1.06 | 1.00 | 0.89 |
| (5) | 0.70 | 0.66 | 0.60 | 0.56 | 0.49 |

| Expressions | Embod. 6 | Embod. 7 | Embod. 8 | Embod. 9 |
|---|---|---|---|---|
| (1) | 0.07 | 0.00 | −0.00 | −0.20 |
| (2) | 0.80 | 0.74 | 0.47 | 0.41 |
| (3) | 0.57 | 0.60 | 0.67 | 0.60 |
| (4) | 0.92 | 0.96 | 1.03 | 0.90 |
| (5) | 0.59 | 0.60 | 0.51 | 0.44 |

What is claimed is:

1. A wide angle imaging lens comprising, successively from the object side, a first lens group made of at least three lenses; a second lens group which has a positive refractive power and is made of three sheets of lenses respectively having positive, negative, and positive refractive powers, each of said three lenses being composed of a single lens or at least two sheets of lenses bonded together; and a third lens group made of at least two sheets of lenses;

wherein all of said lenses are constituted by at least two kinds of materials whose difference in dispersion therebetween is smaller than 0.0055 and wherein the following conditional expressions are satisfied:

$$-0.8 < F/F_1 < 0.2 \tag{1}$$

$$0.2 < F_{23}/F_2 < 1.0 \tag{2}$$

$$0.3 < F/f_a < 1.0 \tag{3}$$

$$0.6 < |F/f_b| < 1.5 \tag{4}$$

$$0.2 < F/f_c < 1.0 \tag{5}$$

wherein

F: focal length of the lens system as a whole;
$F_1$: focal length of the first lens group;

$F_2$: focal length of the second lens group;

$F_{23}$: composite focal length of the second lens group and third lens group;

$f_a$: focal length of the positive lens on the object side in the second lens group;

$f_b$: focal length of the negative lens in the second lens group; and $f_c$: focal length of the positive lens on the image side in the second lens group.

2. A wide angle imaging lens according to claim 1, wherein the material forming each of said lenses has a light transmittance of 50% or higher with respect to light having a wavelength of 300 to 800 nm when said material has a thickness of 10 mm.

3. A wide angle imaging lens according to claim 2, wherein the materials forming said lenses comprise fluorite and quartz and wherein, among the lenses constituting said second lens group, said two positive lenses are made of fluorite, while said negative lens is made of quartz.

* * * * *